United States Patent [19]
Oda et al.

[11] Patent Number: 6,094,208
[45] Date of Patent: Jul. 25, 2000

[54] COLOR IMAGE FORMING APPARATUS WITH SCANNER MOTOR SYNCHRONIZATION

[75] Inventors: Ayumu Oda; Osamu Fujimoto, both of Yamatokoriyama; Syoichiro Yoshiura, Tenri; Nobuo Manabe, Yamatokoriyama; Toshio Yamanaka, Yao; Koji Katamoto, Yamatokoriyama, all of Japan

[73] Assignee: Sharp Kabushiki Kaisha, Osaka, Japan

[21] Appl. No.: 09/139,788

[22] Filed: Aug. 25, 1998

[30] Foreign Application Priority Data

Aug. 27, 1997 [JP] Japan ..................................... 9-230981

[51] Int. Cl.[7] .................................................. G03G 15/04
[52] U.S. Cl. ........................................ 347/118; 347/235
[58] Field of Search ..................................... 347/115, 116, 347/118, 232, 234, 235, 250

[56] References Cited

U.S. PATENT DOCUMENTS 5,381,165  1/1995  Lothus et al. ............................ 347/232
5,808,658  9/1998  Hoover ..................................... 347/250
5,933,182  8/1999  Appel ....................................... 347/234

*Primary Examiner*—Joan Pendegrass
*Attorney, Agent, or Firm*—Dike, Bronstein, Roberts & Cushman, LLP; David G. Conlin

[57] ABSTRACT

In this digital color copier, laser beam scanner units of the same configuration are arranged in parallel with each other, and all are controlled in a unified manner by a laser control unit provided outside the units. In order to synchronously rotate the polygon mirrors in a precise manner, the speeds of rotations of their motors, fed back from tacho-generators are compared to the reference frequency generated from an oscillator so as to allow a motor control circuit to control the driving motors of the polygon mirrors. Further, the BD signals from beam detectors (BD) are fed back to the laser control unit so that all the BD signals from the laser scanner units for black and the three colors can become synchronized with each other, thus enabling control of the polygon mirrors.

5 Claims, 11 Drawing Sheets

COLOR IMAGE FORMING APPARATUS WITH SCANNER MOTOR SYNCHRONIZATION

BACKGROUND OF THE INVENTION (1) Field of the Invention

The present invention relates to a color image forming apparatus of a laser scanning type wherein multiple laser scanning units are used to form color images based on a color digital image signal.

(2) Description of the Prior Art

In a color image forming apparatus, for example, in a color digital copier, the image of a color original input through its scanner is subjected to predetermined image processings and the image data which has been obtained by separating the input image into its color components and color conversion thereof, is reproduced for each of the colors so that the color printer portion produces a reproduced image of the color original. Further, recently, in order to achieve high-speed reproduction of color images at high resolution, color digital copiers which incorporate an image forming apparatus employing laser scan recording technology have been put on the market.

In these color digital copiers, multiple laser deflection scanning units are provided for individual recording portions so that the laser beam for each color, being modulated in accordance with the digital image signal, is brought to sweep the corresponding photoreceptor, thus forming a static latent image for image forming. Such a laser deflection scanning unit mainly comprises a polygon mirror and a motor for driving the polygon mirror at a high speed of rotation.

However, in this color digital copier, the polygon mirrors in the laser deflection scanning units are driven at high speed, which causes problems with respect to the motor's life and the problem of whirring due to air-turbulence caused by polygon mirror rotating etc.

To solve these problems, it is disclosed in Japanese Patent Publication Hei 4 No. 49,688, that when laser recording is not effected, the motors for rotating the polygon mirrors are retarded to a slower speed than when it is in operation or the motors are spun down with the drive of the motor completely stopped. However, in this configuration, the motors need to be controlled so as to completely recover the predetermined speed of rotation in a short period of time, in order to activate the laser recording portions, to revert from the waiting state back to the operating state in which the laser recording portions can effect image recording.

Further, in recent color digital copiers, a recording portion for BK(black) is generally provided in addition to Y(yellow), M(magenta) and C(cyan) recording portions in order to improve black reproduction and hence enhance the total color reproducibility of the color image. Therefore, color digital copiers have been put on the market which have the monochrome mode other than the color mode so as to allow for monochrome copying as well as color copying.

Also in a digital color copier of this type, if all the mirror-driving motors of the laser deflection scanning units in the recording portions are designed to rotate whenever a copying operation is to be done regardless of the mode, either color or monochrome mode, the mirror-driving motors for color will be also driven even in the monochrome mode. Resultantly, the problem of the life of the mirror-driving motors and their noise problem still remain unsolved.

SUMMARY OF THE INVENTION

It is therefore an object of the present invention to provide a color image forming apparatus in which the polygon mirrors in the recording portions required for recording are set into the predetermined state in a reliable manner so as to solve the problems of the life, noise and waste power consumption of the motors and other conventional problems and so as to reduce the time before the first copy to thereby improve work efficiency.

It is another object of the invention to provide a color image forming apparatus in which multiple polygon mirrors are adapted to become exactly synchronized to each other in a short time and hence driven in the synchronized state, thereby facilitating recording of color images which need high accuracy.

The present invention has been devised to attain the above objects, so the present invention is configured as follows:

In accordance with the first aspect of the invention, a color image forming apparatus comprises:

an image information input means for inputting image information;

a laser recording means having a plurality of laser scanner units for component colors of images, arranged in parallel with each other, each scanner unit including a laser, a rotational polygon mirror and a driving motor for driving the rotational polygon mirror;

a laser scan control means for governing the drives of the driving motors for performing laser scanning in accordance with the image information; and an image forming means having a plurality of image forming units for component colors, for forming images, arranged in parallel with each other, each image forming unit forming an image from the latent image recorded on the photoreceptor by the corresponding laser scanner unit, and is characterized in that the laser scan control means, based on the periodic signal obtained every predetermined period of time from the laser scanner unit which is driven under the predetermined rotational conditions, of the plurality of laser scanner units arranged in parallel with each other, drives the rotations of the remaining laser scanner units and controls each laser scanner unit so that the periodic signals from all the laser scanner units become synchronized with each other.

In accordance with the second aspect of the invention, a color image forming apparatus comprises:

an image information input means for inputting image information;

a laser recording means having a plurality of laser scanner component colors of images, arranged in parallel with each other, each scanner unit including a laser, a rotational polygon mirror and a driving motor for driving the rotational polygon mirror;

a laser scan control means for governing the drives of the driving motors for performing laser scanning in accordance with the image information; and an image forming means having a plurality of image forming units for component colors, for forming images, arranged in parallel with each other, each image forming unit forming an image from the latent image recorded on the photoreceptor by the corresponding laser scanner unit, and is characterized in that the laser scan control means, based on the periodic signal obtained every predetermined period of time from the first laser scanner unit which has been driven under the predetermined rotational conditions, of the plurality of laser scanner units arranged in parallel with each other, drives the rotation of the second laser scanner units and controls each laser scanner unit so that the periodic signals from all the laser scanner units become synchronized with each other.

In accordance with the third aspect of the invention, the color image forming apparatus having the above second feature is characterized in that the laser scanner control means performs control, either by the first mode in which a monochrome image is produced by controlling the scanning of the rotational polygon mirror in the first laser scanner unit so as to rotate it based on the first reference clock signal, or by the second mode in which the second reference clock signal is produced by frequency dividing the first reference clock signal so that a color image is produced by controlling the scanning of the rotational polygon mirror in the first laser scanner unit so as to rotate it based on the second reference clock signal and also by controlling the drives of the rotational polygon mirrors in the second laser scanner units so as to rotate them based on the same clock signal.

In accordance with the fourth aspect of the invention, the color image forming apparatus having the above second feature is characterized in that the laser scanner control means starts laser scanning based on the synchronizing signals obtained at intervals of a predetermined period from each of the laser scanner units, and when a monochrome image is produced by laser scanning, the scanning and recording of a monochrome image is allowed for based on the synchronizing signal obtained from the first laser scanner unit, whereas when a color image is produced by laser scanning, the scanning and recording of a color image is allowed for based on the synchronizing signals from the first laser scanning unit and the second laser scanning units.

In accordance with the fifth aspect of the invention, the color image forming apparatus having the above fourth feature is characterized in that the laser scanner control means gives warning of an anomalous state, if the synchronizing signals to be obtained at intervals of a predetermined period from the laser scanning units are not obtained within the predetermined time.

In accordance with the first feature of the invention, based on one of the beam detect signals (to be referred to as BD signals, hereinbelow) from the laser recording units for recording images of yellow, magenta, cyan and black, the driving motors of the remaining laser recording units for recording images are driven in such a manner that the BD signal from each laser recording unit is synchronized with the reference BD signal. As a result, the rotation of the driving motor for each color can be precisely synchronized with that of the others within a short period.

In accordance with the second feature of the invention, the laser scanner for recording black color component is in the standby state with the predetermined speed of rotation, and based on the BD signal from the scanner for black as a reference, the driving motors of the laser scanners for recording color components of the image, which are in a stopped, standby state are driven in such a manner that the BD signal from each laser scanner will be synchronized with the reference BD signal. Thus, based on the signal from the driving motor which is rotating at the stabilized rate, the drives of the remaining motors will be synchronized as rotating while the motors are set into the proper state. As a result, the rotation of the driving motor for each color can be precisely synchronized with that of the others within a short period, and hence it is possible to provide high-quality color images as well as shortening the time before recording.

In accordance with the third feature of the invention, the speed of rotation of multiple rotational polygon mirrors can be controlled using a single oscillator, precisely and within a short time, without needing an increased number of parts and/or a complicated configuration. Accordingly, the copying operation in the monochrome mode which is used more frequently, can be performed at higher rate, and it is possible to allow for use of simple and inexpensive parts for the laser scanners which will be used in the color mode only while the parts of the laser scanner for the monochrome mode are of long-life and durable for high-speed driving.

In this way, it is possible to prevent copying when the rotations of all the polygon mirrors are not synchronized with each other. Thus, this configuration prevents degradation of color images such as color banding etc., and provides for a reliable quality of image.

In accordance with the fourth feature of the invention, in the monochrome mode, the BD signal from the laser scanner unit for recording black color component is used to check whether the polygon mirror has reached the speed of rotation corresponding to the predetermined reference frequency. In the color mode, after the time lag of each BD signal from the reference BD signal from the laser scanner unit for black color component has fallen within the predetermined range, each of the BD signals from individual laser beam scanner units are checked so as to confirm that each polygon mirror has reached the speed of rotation corresponding to the predetermined reference frequency. Therefore, it is possible to prevent the implementation of copying when the rotations of the polygon mirrors are asynchronous with each other. Accordingly, this configuration prevents degradation of color images such as color banding etc., and can keep a reliable quality of image.

In accordance with the fifth feature of the invention, if the drives of the polygon mirrors cannot be stabilized and the polygon mirrors for colors cannot be synchronized with each other within the predetermined period of time, the fact that any anomaly has occurred will be displayed on the liquid crystal display device on the control panel so as to inform the user that the machine is in a state in which the resulting image quality cannot be guaranteed and recommends that the user perform a check thereby prevent loss of the reliability of the copier.

DESCRIPTION OF THE PREFERRED EMBODIMENTS

The embodiments of the invention will hereinafter be described with reference to the accompanying drawings.
(Configuration of the color digital copier)

Figure 1:
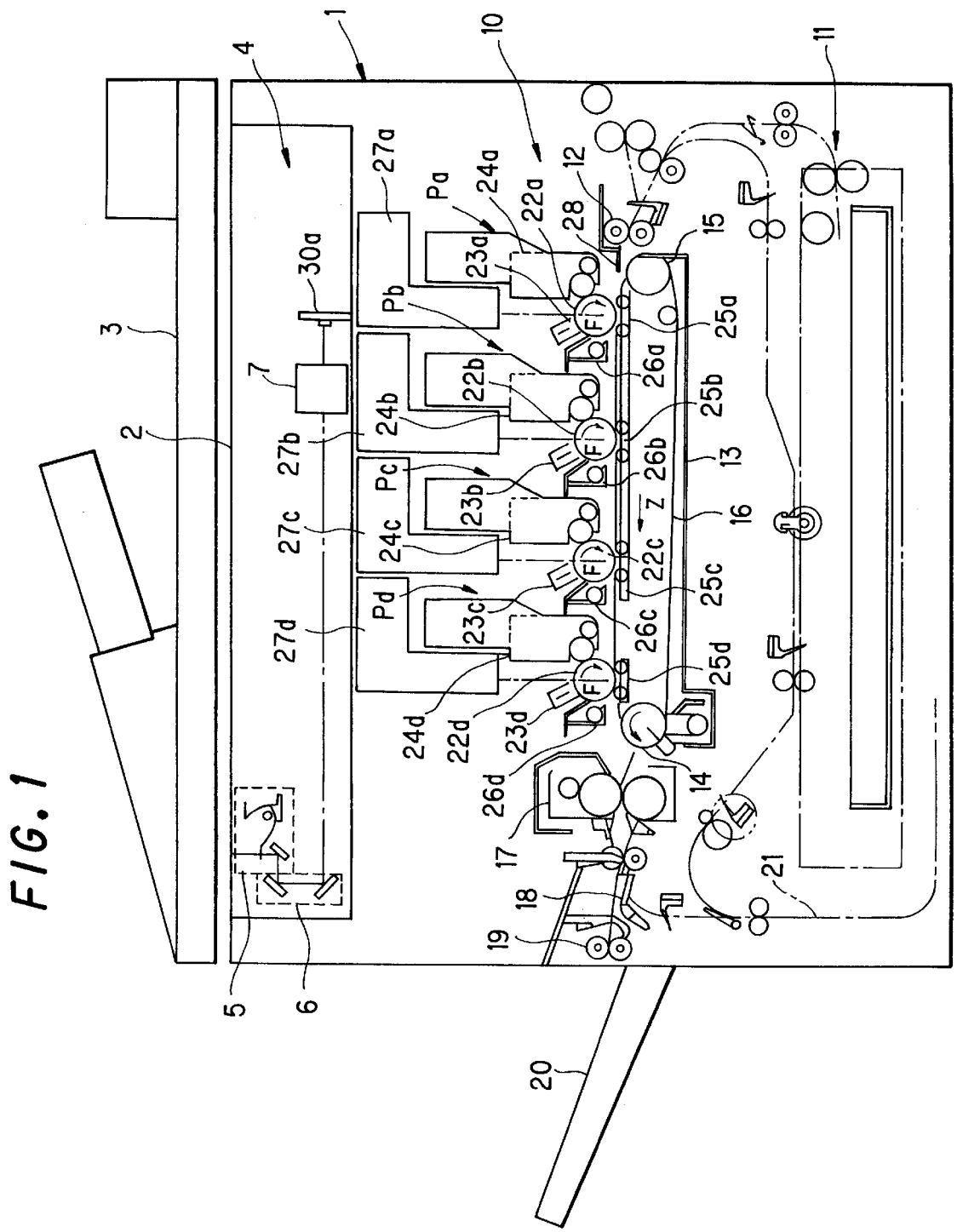
FIG. 1 is a front sectional view showing the schematic configuration of a digital color copier as an image forming apparatus in accordance with the invention.

FIG. 1 is an overall front sectional view showing the configuration of a digital color copier as the image forming apparatus of the invention. Provided on the top of a copier body 1 are an original table 2 and a control panel while an automatic document feeder 3 is mounted on the top of original table 2. The automatic document feeder 3 is positioned with the predetermined relationship relative to the surface of original table 2 and supported so as to be opened and closed relative to original table 2. Further, copier body 1 incorporates an original scanner 4 as the image reading portion and an image forming portion 10.

First, automatic document feeder 3 is mounted over original table 2, i.e., on the top of copier body 1. This feeder is a reversing automatic document feeder 3 capable of handling double-sided originals. An original is fed so that one side thereof opposes original table 2 at the predetermined position. After completion of reading the image on one side, the original is inverted and fed so that the other side opposes original table 2 at the predetermined position.

When the images on both sides of one original have been captured, this original is discharged and the duplex feeding operation of the next original will be effected. The operations of feeding the original and inverting the original are controlled in conformity with the operation of the whole copier. In order to capture the image of the original fed onto original table 2 by reversing automatic document feeder 3, original scanner 4 is provided so as to reciprocally move in parallel along the underside of original table 2.

This original scanner 4 composes a first scanning unit 5, second scanning unit 6, optical lens 7 and photoelectric converting element 30a. The first scanning unit 5 is composed of an exposure lamp for illuminating the original image surface and the first mirror which deflects the reflected light from the original in the predetermined direction. This scanning unit 5 is located under the original table and moves back and forth at the predetermined scanning speed in parallel with and spaced from, the undersurface of the original table. The second scanning unit 6 is composed of the second and third mirrors which move back and forth in a parallel manner keeping a certain speed relationship relative to the first scanning unit 5. The light reflected on the original and deflected by the first mirror of the first scanning unit 5 is further deflected by this second scanning unit in the predetermined direction. Optical lens 7 focuses the light reflected off the original and deflected by the third mirror of the second scanning unit, on the predetermined position forming a reduced image in size. Color CCD 30a as the photoelectric converting element photo-electrically converts the image of light reduced and focused by optical lens 7 to produce an electric signal representing the reflected image of light from the original. The original image information thus converted into an electric signal by this color CCD 30a is then transferred to an image processor 31, to be described hereinbelow, where the signal is appropriately processed as image data.

Next, image forming portion 10 located in the lower side of copier body 1 will be described. Provided at the bottom of image forming portion 10 shown in FIG. 1 is a paper feeder mechanism 11, which separates sheets one by one from a stack of sheets accommodated in the sheet tray and feeds the sheet toward the recording station. The sheet thus separated and fed one by one is timing controlled and fed by a pair of resist rollers 12 located before image forming portion 10. For duplex printing, the sheet is re-fed and conveyed in synchronization with the operation of image forming portion 10.

Provided in the lower part of image forming portion 10 is a transfer conveyor belt mechanism 13 extending in a substantially parallel manner with the image forming portion. This transfer conveyor belt mechanism 13 is composed of a transfer conveyer belt 16 wound between a plurality of rollers such as a driving roller 14, driven roller 15 and the like so that the belt electrostatically attracts the paper thereto to convey it.

Provided on the downstream side of transfer conveyer belt mechanism 13 is a fixing unit 17 for fixing the toner image that has been transferred to the paper, onto the paper. The paper passes through the fixing roller nip of fixing unit 17 and further passes through a sheet path switching gate 18 and then discharged by a discharge roller 19 onto paper output tray 20 attached to the exterior wall of the machine.

Switching gate 18 is provided to select one of the two sheet paths, that is, one for discharging the sheet after fixing and the other for re-feeding the sheet to image forming portion 10. For duplex printing, the path of the sheet is switched by switching gate 18 so that the sheet is guided to the re-feeding path to image forming portion 10, and then is inverted upside down through a switch-back conveyance path 21 to be re-fed to image forming portion 10.

Arranged closely over the transfer conveyer belt 16 which is stretched in a substantially parallel manner between driving roller 14, driven roller 15 and the like, are the first, second, third and fourth image forming stations Pa, Pb, Pc and Pd arranged in parallel, in this order from the upstream side with respect to the sheet conveying direction. Transfer conveyor belt 16 is frictionally driven by the direction shown by arrow Z in FIG. 1 by means of driving roller 14, carrying the sheet as copy material which is fed by sheet feeder mechanism 11 as already explained. In this way, the sheet is successively conveyed through image forming stations Pa, Pb, Pc and Pd.

Image forming stations Pa, Pb, Pc and Pd have substantially the same configuration, and include photoreceptor drums 22a, 22b, 22c and 22d, respectively, each being rotated in the direction of arrow F in FIG. 1. Provided around photoreceptor drum 22a, 22b, 22c and 22d, are a charger 23a, 23b, 23c and 23d for uniformly charging the photoreceptor drum, a developing unit 24a, 24b, 24c and 24d for developing the static latent image formed on the photoreceptor drum, a transfer charger 25a, 25b, 25c and 25d for transferring the toner image thus developed to the sheet and a cleaning device 26a, 26b, 26c and 26d for removing the leftover toner from the photoreceptor drum. These components are arranged around the photoreceptor drum in the above-mentioned order with respect to the rotational direction of the photoreceptor drum.

Provided above photoreceptor drums 22a, 22b, 22c and 22d are laser beam scanner units 27a, 27b, 27c and 27d, respectively. Each laser beam scanner unit includes a semiconductor laser element emitting a spot beam of light being moderated with image data, a deflecting device for deflecting the laser beam from the semiconductor laser element in the main scan direction, and an f-θ lens for focusing the laser beam deflected by the deflector onto the photoreceptor surface. The deflector incorporates a rotational polygon mirror and a mirror-driving motor for driving the rotational polygon mirror at high speed of rotation.

Input to laser beam scanner 27a is the pixel signal corresponding to the yellow component image of a color original image; input to laser beam scanner 27b is the pixel signal corresponding to the magenta component image of a color original image; input to laser beam scanner 27c is the pixel signal corresponding to the cyan component image of a color original image; and input to laser beam scanner 27d is the pixel signal corresponding to the black component image of a color original image.

In this arrangement, a static latent image corresponding to the color-converted original image information is formed on the corresponding photoreceptor drum 22a, 22b, 22c and 22d in each recording unit. Each recording station holds a different color toner, that is, yellow toner in developing unit 24a, magenta toner in developing unit 24b, cyan toner in developing unit 24c and black toner in developing unit 24d, respectively. Accordingly, in each recording station, the color-converted original image information is reproduced as a toner image having each individual color.

A paper attraction (brush-like) charger 28 is provided between the first image forming station Pa and sheet feeder mechanism 11. This paper attraction charger 28 charges the surface of transfer conveyer belt 16 so that the belt will be able to convey the paper as the copy paper, fed from paper feeder mechanism 11 from the first image forming station Pa to the fourth image forming station Pd whilst tightly attracting it thereon without causing any slippage or displacement.

A charge erasing device (not shown) is provided approximately above driving roller 14 between the fourth image station Pd and fixing unit 17. This charge erasing device is applied with an alternating current so as to separate the sheet which is electrostatically attracted to conveyer belt 16.

In the thus configured digital color copier, cut-sheet paper is used as the copy material. This copy sheet is delivered out from the paper cassette and fed into the guide to the sheet conveying path of paper feeder mechanism 11, then the leading part of the copy sheet is detected by the aforementioned sensor (not shown). Then the copy sheet is halted at resist roller pair 12 based on the detection signal output from the above sensor. Thereafter, the sheet is conveyed toward conveyor belt 16 running in the direction of arrow Z in FIG. 1, at a time synchronized with the operations of image forming stations Pa, Pb, Pc and Pd. During conveyance, the sheet will be conveyed stably passing through image forming stations Pa, Pb and Pc and Pd since conveyer belt 16 has been charged appropriately by paper attraction charger 28 mentioned above.

In each image forming station Pa, Pb, Pc and Pd, a toner image of a different color is formed by the aforementioned arrangement, and each toner image is superimposed over the support surface of the copy sheet being electrostatically attracted to and conveyed by conveyer belt 16. When the transfer of the image in the fourth image forming station Pd has been completed, the copy sheet, specifically the leading edge of the paper, is separated from conveyer belt 16 with the help of the charge erasing charger, and is conveyed to fixing unit 17. Finally, the copy sheet with a toner image fixed thereon is discharged through the copy sheet output port to paper output tray 20.

(Illustration of the circuit of the image processing unit)

Next, the configuration and function of the image processing circuit of the color image information, installed in the digital color copier, will be described.

Figure 2:
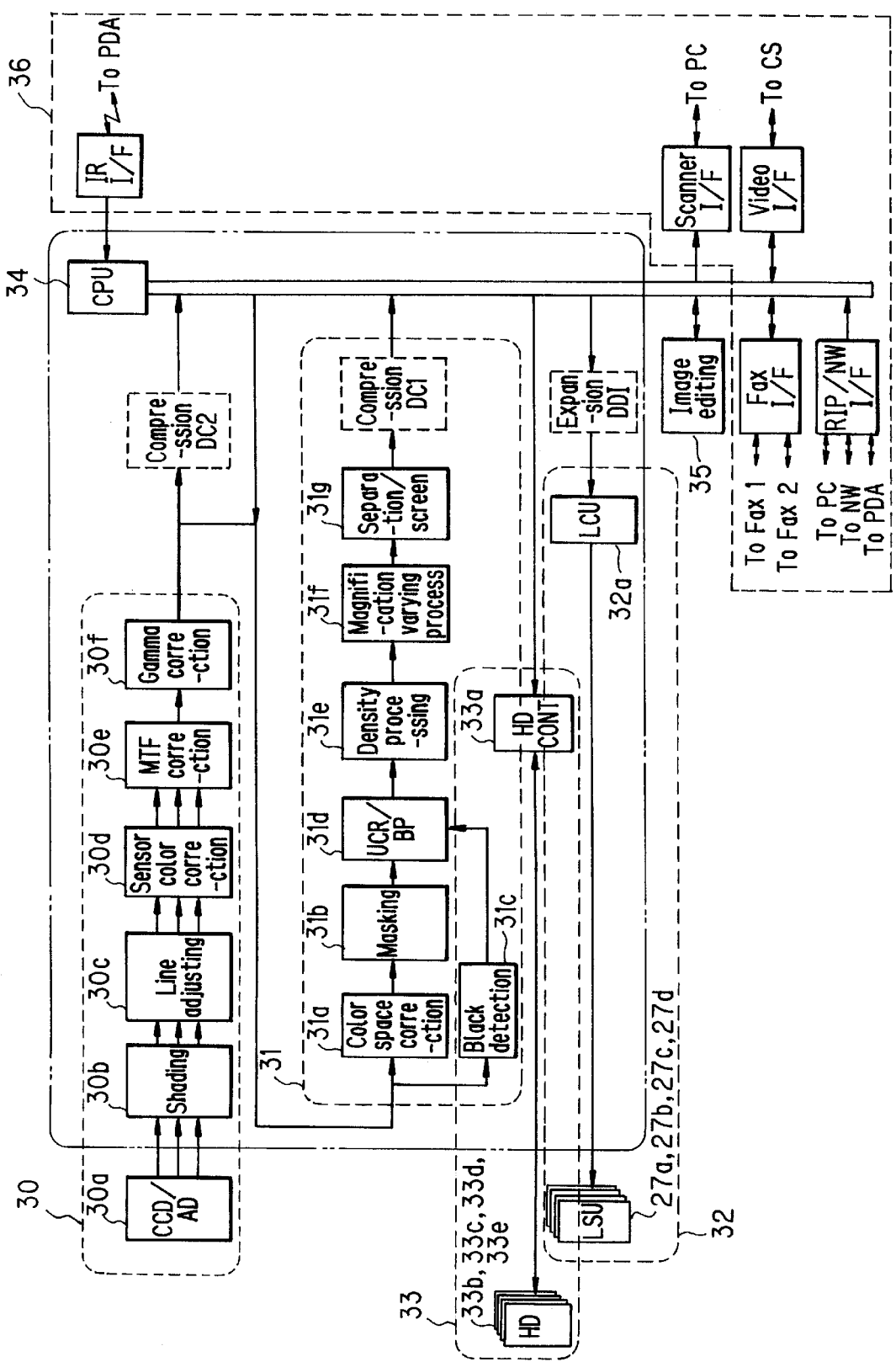
FIG. 2 is a block diagram showing an image processing circuit of a digital color copier.

FIG. 2 is a block diagram showing an image processing unit contained in the digital color copier. The image processing circuit contained in this digital copier comprises an image data input portion 30, image processing portion 31, image data output portion 32, image memory 33 composed of hard disk drivers etc., a central processing unit (CPU) 34, an image editing portion 35 and an external interface portion 36.

Image data input portion 30 includes: a three-line color CCD 30a capable of capturing a color original image and outputting RGB color separated line data, also shown in FIG. 1; a shading correcting circuit 30b for correcting the line image level of the line data captured by color CCD 30a; a line adjusting portion 30c with line buffers to correct the displacement of line data; a sensor color correcting portion 30d for correcting color data of the line data for each color; an MTF correcting portion 30e for correcting or enhancing the signal for every pixel; and a gamma-correcting portion 30f for performing a visual sensitivity correction by adjusting the brightness of the image.

Image processing portion 31 comprises: a color space correcting circuit 31a; a masking circuit 31b; a black component detecting circuit 31c, an under color removal/black adding circuit (UCR/BP) 31d; a density processing circuit 31e; a magnification varying circuit 31f; separation/screen circuit 31g.

Here, color space correcting circuit 31a adjusts the reproducible color range of the color image signal being input through image data input portion 30 or an aftermentioned external interface portion 36, to the reproducible color range of the color toner in the recording apparatus. Masking circuit 31b converts the RGB signals of the input image data into the YMC signals corresponding to the recording units of the recording apparatus. Black component detecting circuit 31c detects the black component from the RGB signals of the color image being input through image data input portion 30 or aftermentioned interface portion 36. Under color removal/black adding circuit 31d, based on the YMC signals being output from masking circuit 31b, performs black addition of the black component signal being output from black component detecting circuit 31c. Density processing circuit 31e adjusts the density of the color image signal based on a density converting table. Magnification varying circuit 31f varies the magnification of the input image information based on the selected magnification. Separation/screen circuit 31g detects characters, photography, halftone areas in the image information, from the input image data to separate the areas one from another and determine the output pattern of the image.

Image data output portion 32 comprises: a laser control unit 32a for performing pulse-width modulation based on the image data of each color; and laser scanner units (LSU) 27a, 27b, 27c and 27d for the different colors to perform laser recording based on the pulse width modulated signals in accordance with image signals for the different colors output from laser control unit (LCU) 32a. Laser control unit (LCU) 32a also controls the mirror-driving motors which drive the rotational polygon mirrors for laser deflection so as to allow for laser scanning in accordance with the image information.

Image memory 33 is composed of: a hard disk control unit (HDCU) 33a, which successively receives four color sets of 32 bit image data (8 bits for each color) output from image processing portion 31, temporarily stores the data in the buffer and converts the 32 bit data into four sets of 8 bit image data (for four colors) in order to separately control them into the four hard disks; and four hard disks (HD) 33b, 33c, 33d and 33e for separately storing and controlling the 8 bit image data of respective colors.

Central processing unit (CPU) 34 controls image data input portion 30, image processing portion 31, image data output portion 32, image memory 33, image editing portion 35 and external interface portion 36 (the latter two will be detailed hereinbelow), based on the predetermined sequence.

Image editing portion 35 performs predetermined image editing of the image data which is stored temporarily in image memory 33 after being processed through image data input portion 30, image processing portion 31 or interface portion 36 to be described hereinbelow. Interface portion 36 is a communication interface means for receiving the image data from an external image input processing unit separately provided outside the digital copier. Examples of external input include a facsimile machine, image reader, external scanner, video and image data from a network, as shown in FIG. 2.

Image data input from interface portion 36 is also temporarily input into image processing portion 31 where color space correction etc. is performed, so that the data is level converted so as to be handled by the image memory 33 of the digital copier. Then, the thus processed data is stored in and controlled by hard disks 33b, 33c, 33d and 33e.

(Explanation of control scheme of the digital copier on the whole)

Figure 3:
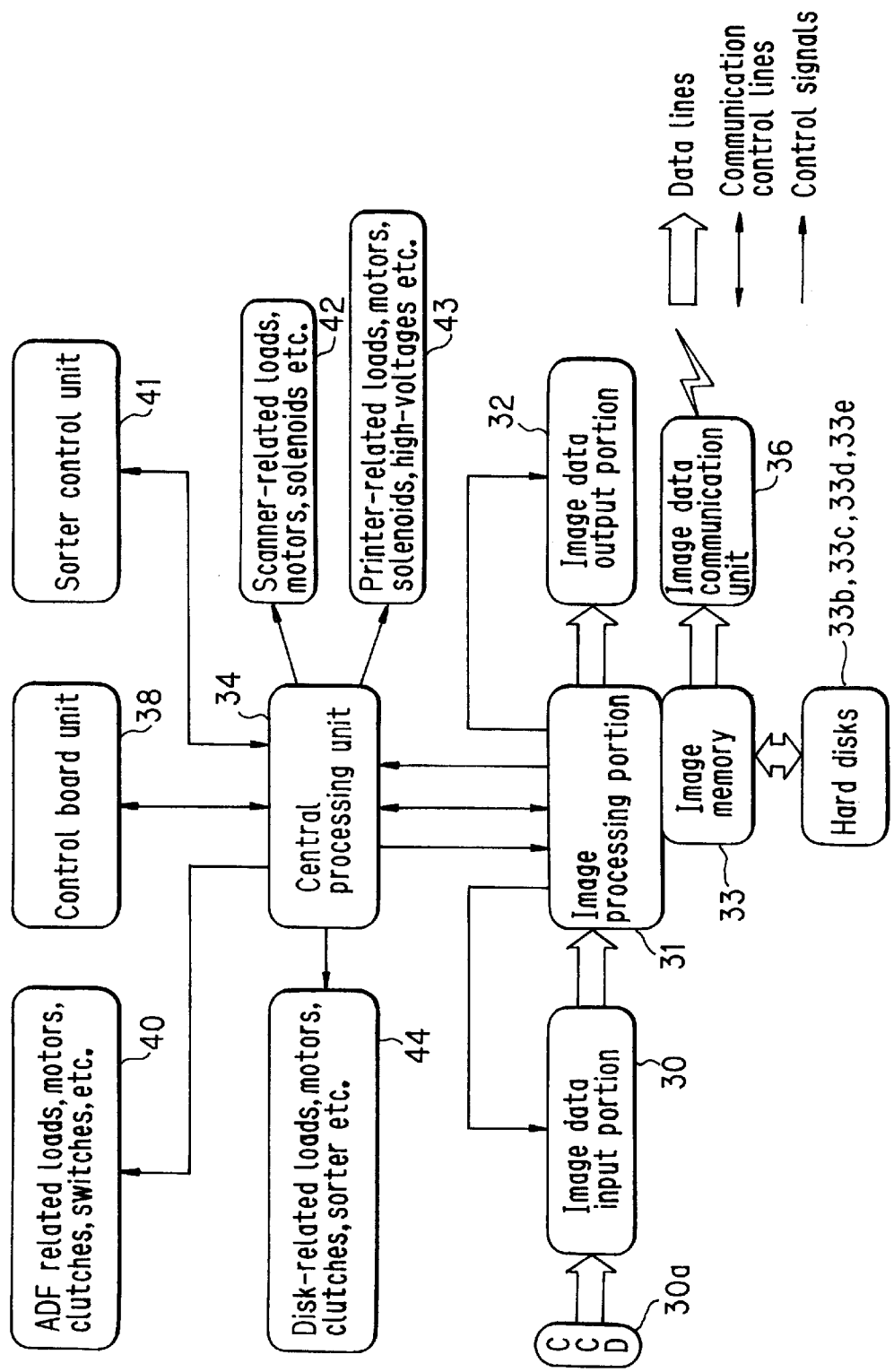
FIG. 3 is a block diagram showing the whole configuration of a digital color copier.

FIG. 3 is a block diagram showing the units in the digital copier showing the state where CPU 34 controls the operations of different units. Explanation concerning image data input portion 30, image processing portion 31, image data output portion 32, image memory 33 and CPU 34 is contained in FIG. 2 and is omitted.

CPU 34 performs sequence control of each driver mechanism constituting the digital copier, such as ADF 40, a sorter unit 41, a scanner unit 42, laser printer unit 43, disk related loads 44 and output control signals to these units. Further, CPU 34 is connected to control board unit 37 made up of a control panel in an inter-communicable manner so that control signals in accordance with the copy mode designated by the operator are transferred to CPU 34 to thereby operate the digital copier in accordance with the setup mode.

CPU 34 issues a control signal representing the operating state of the digital copier to control board unit 38 as the control panel. The control board unit 38 side, based on this control signal, displays the operating state through a display etc., so as to inform the operator of in what state the copier is.

External interface 36 as the image data communication unit, as has been described in FIG. 2, is provided to enable communications of information such as image information, image control signals, etc., with other digital imaging appliances.

CPU 34 further has a image forming state control means. This image forming control means is to control the image forming states of image forming stations Pa to Pd, and the detail will be described later.

(Explanation of the control panel)

Figure 4:
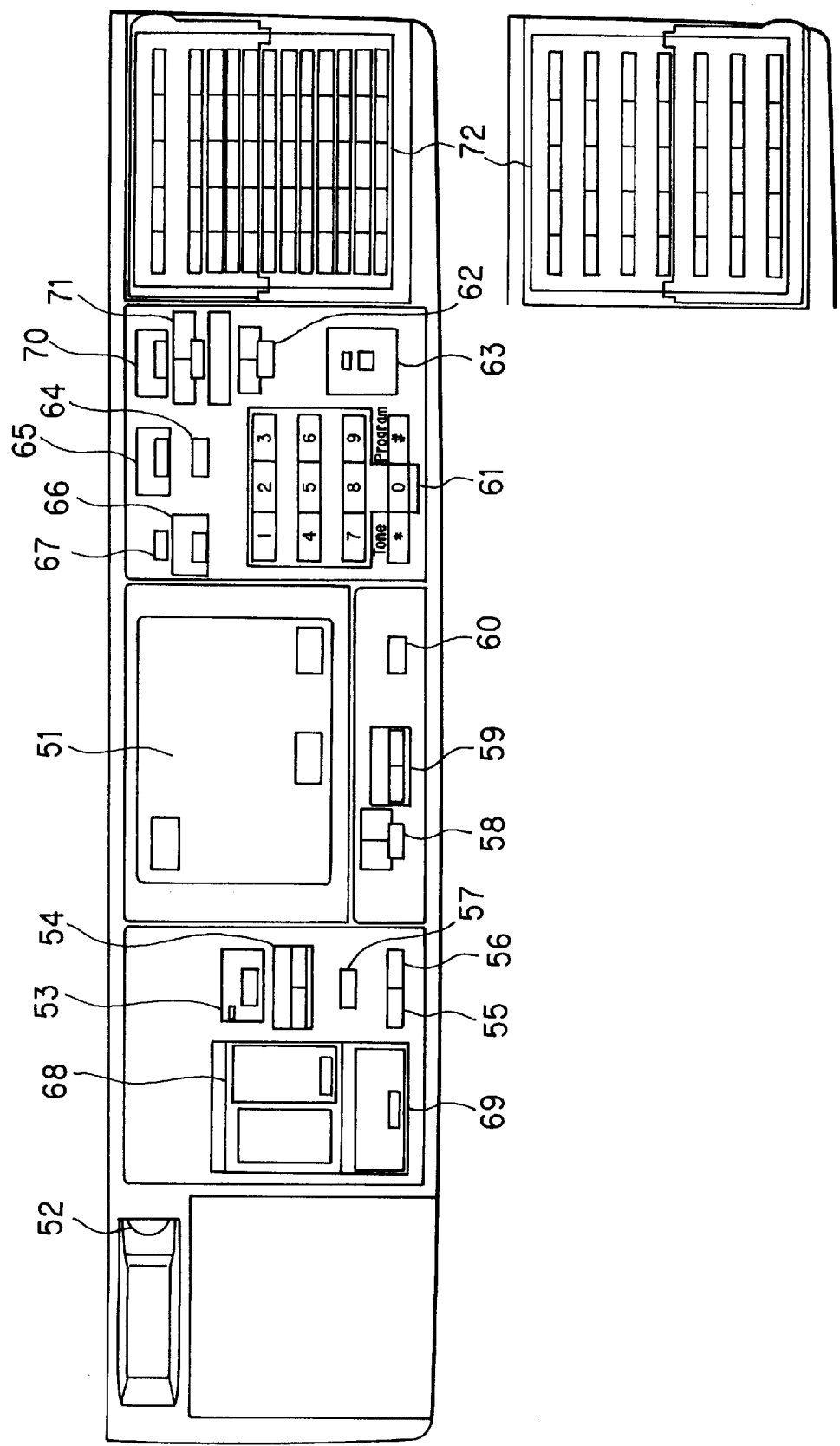
FIG. 4 is a view showing the control panel of a digital color copier.

Referring next to FIG. 4, the control panel of digital color copier 1 will be described.

Arranged in the center of control panel 38 is a touch panel type liquid crystal display device 51 having a group of mode setup keys arranged on the periphery thereof. Displayed continuously on the screen of touch-type liquid crystal display device 51 is a frame switching command area for switching the frame to allow for selection of image editing functions. When this area is directly operated with a finger, a list menu of various editing functions appears on the liquid crystal screen. When the operator touches with a finger an area representing the operator's desired function from the variety of image editing functions displayed, a desired editing function can be selected.

Now, setup keys arranged on the control panel will be briefly described. Designated at 52 is a dial for adjusting the brightness of the screen of liquid crystal display device 51. Designated at 53 is an automatic magnification setting key for setting up the mode in which the magnification is selected automatically; 54 a zoom key for setting the copy magnification with increments of 1%; 55 and 56 fixed magnification keys for selecting a fixed magnification from the predetermined magnifications; and 57 an isometric magnification key for reverting the copy magnification to the standard magnification (isometric magnification).

Designated at 58 is a density switching key allowing for switching of copy density adjustment modes, from the automatic mode to the manual or photographic mode; 59 a density adjusting key allowing for fine control of the density level in the manual or photographic mode; and 60 a tray selecting key allowing for selection of a desired paper size from the sheet sizes of the paper set in the paper feeder of digital color copier 1.

Designated at 61 is a copy number setting key allowing for setup of the copy number; 62 a clear key for clearing the copy number and stopping a continuous copying operation partway; 63 a start key for instructing the copy start; 64 a reset key for canceling all the currently set modes and reverting to the default state; 65 a cut-in key for permitting a copying operation of other originals during the current continuous copying operation; 66 a control guide key for allowing for message display of control methods of the copier when the user does not know how to control digital color copier 1; and 67 a message progression key for displaying the next message to the one displayed by the operation of control guide key 66. Designated at 68 is a duplex mode setting key allowing for setup of a duplex copy mode; and 69 a post-processing mode selecting key for setting the operating mode of the post-processing apparatus for sorting copies discharged from digital color copier 1.

Designated at 70 to 72 are setting keys concerning printer and facsimile modes, specifically, 70 is a memory transmission mode key allowing for transmission of the data of an original which have been once stored in the memory; 71 is a copy, fax and print mode selecting key for selecting one operating mode of digital color copier 1, from copy, fax and print modes; and 72 designates quick dialing keys allowing the user to make an instant selection of a fax addressee upon transmission, from previously stored addressee's phone numbers.

The control panel and the keys arranged on the control panel presented here are just an example, and the arrangement of keys on the control panel will needless to say be different depending upon the functions installed in digital color copier 1.

(Explanation of the laser beam scanner unit)

Figure 5:
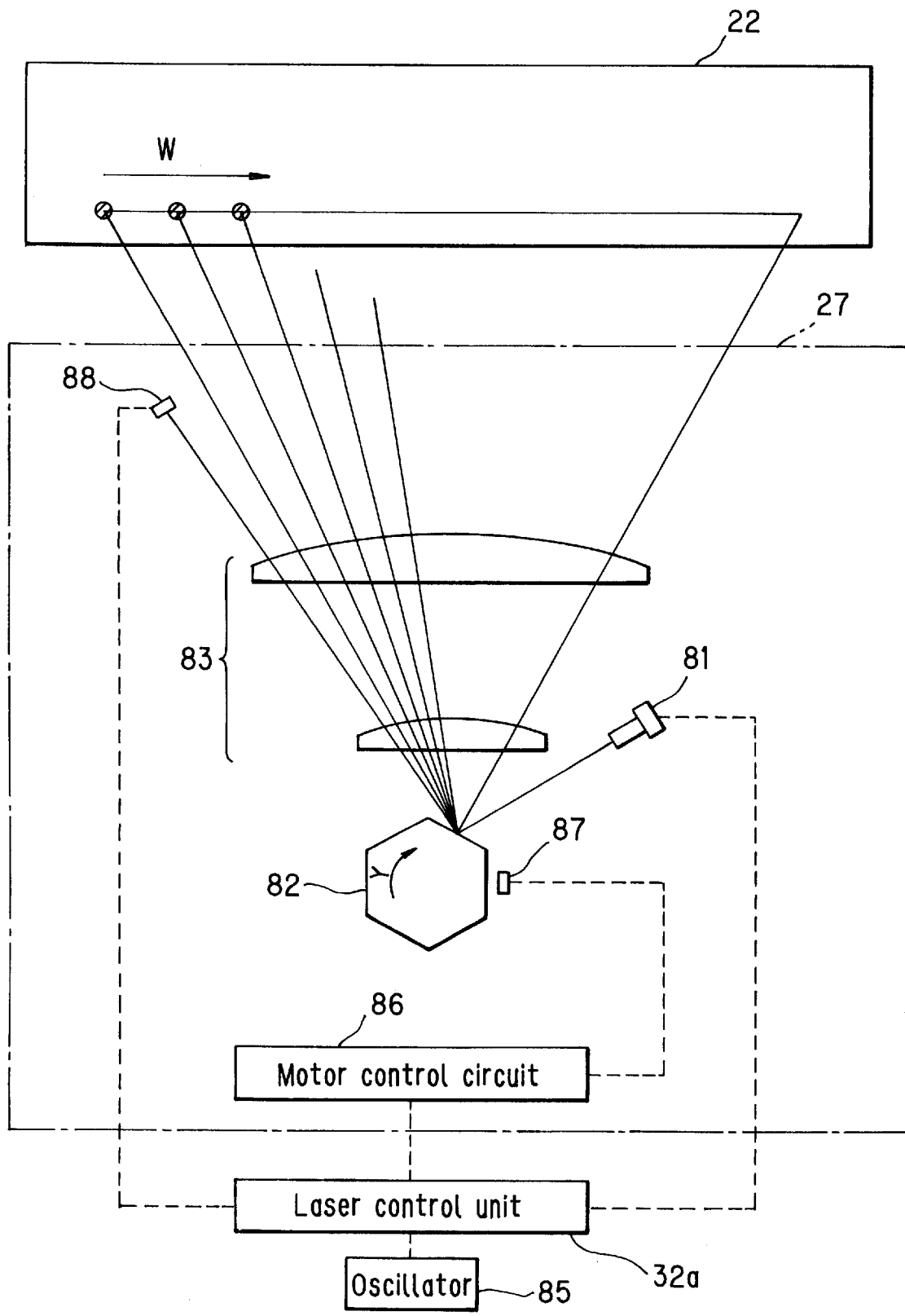
FIG. 5 is a diagram showing the configuration of a laser beam scanner unit.

Referring next to FIG. 5, the configuration and operation of the laser beam scanner unit (LSU) will be described.

Laser beams emitted from laser emitter 81 are deflected by a polygon mirror 82 which rotates at a high speed so as to scan photoreceptor 22 via a lens system 83. This lens system 83 functions to focus the laser beam deflected by the polygon mirror 82 rotating at an angular speed, so that the focused spot of the beam will scan the photoreceptor 2 linearly at a uniform velocity. Polygon mirror 82 is rotated by an integrated driving motor in the direction shown by arrow Y in the drawing so that the laser spot thus deflected moves in the direction of arrow W in the figure.

LSU 27 is controlled by laser control unit (LCU) 32a which is provided separately outside the LSU. LCU 32a has an oscillator 85 for generating a signal of a reference frequency corresponding to the predetermined speed of rotation at which polygon mirror 82 needs to be rotated during image recording. LCU 32a supplies this frequency signal to LSU 27 so as to control the start, stop, waiting etc. of rotation of the mirror.

LSU 27 incorporates therein a motor control circuit 86 that receives the signal from LCU 32a and a tacho-generator 87 for continuously monitoring the speed of rotation of polygon mirror 82. Motor control circuit 86 continuously compares the signal produced from tacho-generator 87 with the reference frequency signal supplied from LCU 32a and performs power control of the driving motor so that polygon mirror 82 will rotate uniformly at the predetermined speed of rotation.

A BD 88 for sensing the laser beam is provided inside LSU 27 and located before the position from which the laser beam writing starts. LCU 84, based on the signal produced from BD 88, grasps the starting position of laser writing, and supplies a write signal in accordance with the image data, to laser emitter 81 so as to perform writing.

Next, the first to fifth embodiments of the invention will be described with reference to FIGS. 6 through 11.

The 1st Embodiment

The first embodiment will be now described. This embodiment is implemented in the digital color copier described above, in which LCU 32a, based on the periodical signal obtained every predetermined period from one of LSUs 27a to 27d driven under the predetermined rotation conditions, controls and drives the rotations of the remaining laser scanners, so that all the laser scanners produce synchronized periodical signals.

As shown in FIG. 1, the digital color copier has image forming stations Pa, Pb, Pc and Pd, having the same configuration and arranged in parallel to each other inside image forming portion 10 so as to produce color representation by forming and superimposing images of yellow, magenta, cyan and black, in this order, for example.

Figure 6:
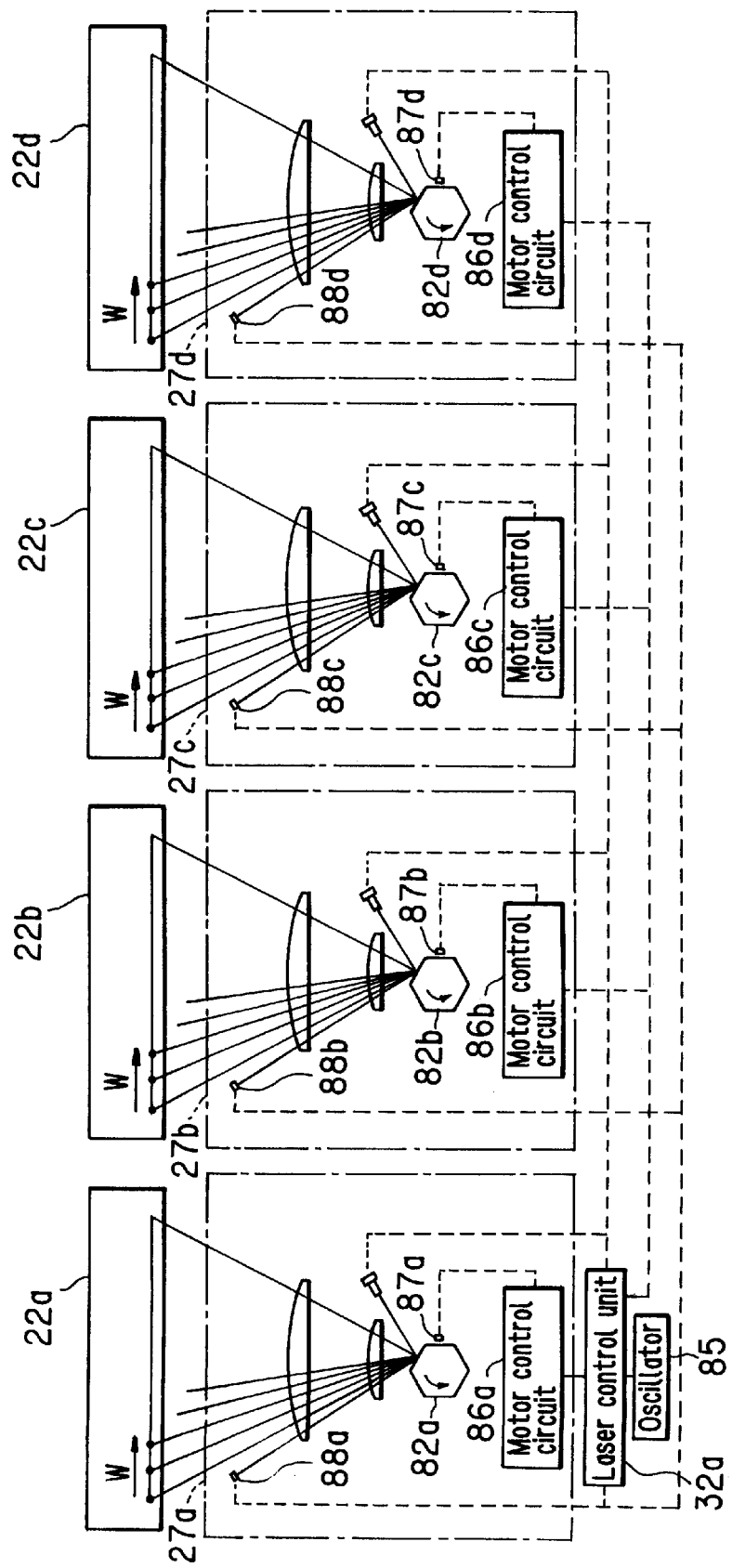
FIG. 6 is a block diagram showing laser beam scanner units for forming color images.

FIG. 6 is a control block diagram of LSUs 27a to 27d constituting the above image forming stations Pa to Pd. Each unit has the same configuration and arranged in parallel to others and all are controlled in a unified manner by LCU 32a provided outside the units.

As to a digital color copier of this type, it has been known that if all the polygon mirrors 82a to 82d in LSU 27a to 27d do not rotate in synchronization with each other or if writing operations cannot start from the corresponding starting positions when writing the image, at the same timing, the starting time of writing might deviate up to one whole pitch as a maximum (e.g., 42.3 $\mu$m when the resolution is 600 dpi) thus causing difficulties in recording color reproduction with the color pixels displaced to a random amount on the printing paper. Therefore, it is a necessity for a system of this kind to rotate polygon mirrors 82a to 82d accurately synchronized with one another.

In order to achieve the above requirements, control as follows will be implemented in this embodiment.

First, in order to rotate polygon mirror 82d of LSU 27d allotted for forming the black image, at the predetermined speed of rotation, LCU 32a outputs a reference frequency signal based on the reference frequency oscillation generated from oscillator 85. Motor control circuit 86d, receiving the reference frequency signal, drives the driving motor of polygon mirror 82d. For this driving, the motor control circuit compares the speed of rotation of polygon mirror 82d, detected and fed back from tacho-generator 87d, with the reference frequency signal, to perform voltage control of the motor so as to rotate polygon mirror 82d at the predetermined speed.

In a similar manner, LSUs 27a, 27b and 27c allotted for forming images of yellow, magenta and cyan respectively are rotated at the predetermined speed.

Next, test laser scanning is effected with LSU 27d allotted for forming black images, and the signal periodically obtained from BD 88d is fed back to LCU 32a. Similarly, laser scanning tests are also effected with LSUs 27a, 27b and 27c allotted for forming images of yellow, magenta and cyan, and the signals periodically obtained from respective BDs 88a, 88b and 88c are fed back to LCU 32a.

In LCU 32a, the signal from BD 88d is compared as to timing with the signals from other BDs, and if there are some discrepancies, LCU 32a outputs signals which will increase or decrease the speeds of rotations of the polygon mirrors, to LSUs 27a, 27b and 27c.

This control is repeated until the discrepancies of the signal from BD 88d from the signals from the other BDs fall within the predetermined range so as to drive polygon mirrors 82a, 82b, 82c and 82d in a precisely synchronized manner. The BD reference signal should not be limited to the signal from BD 88d, but may of course be of the signal of any other BD.

Figure 7:
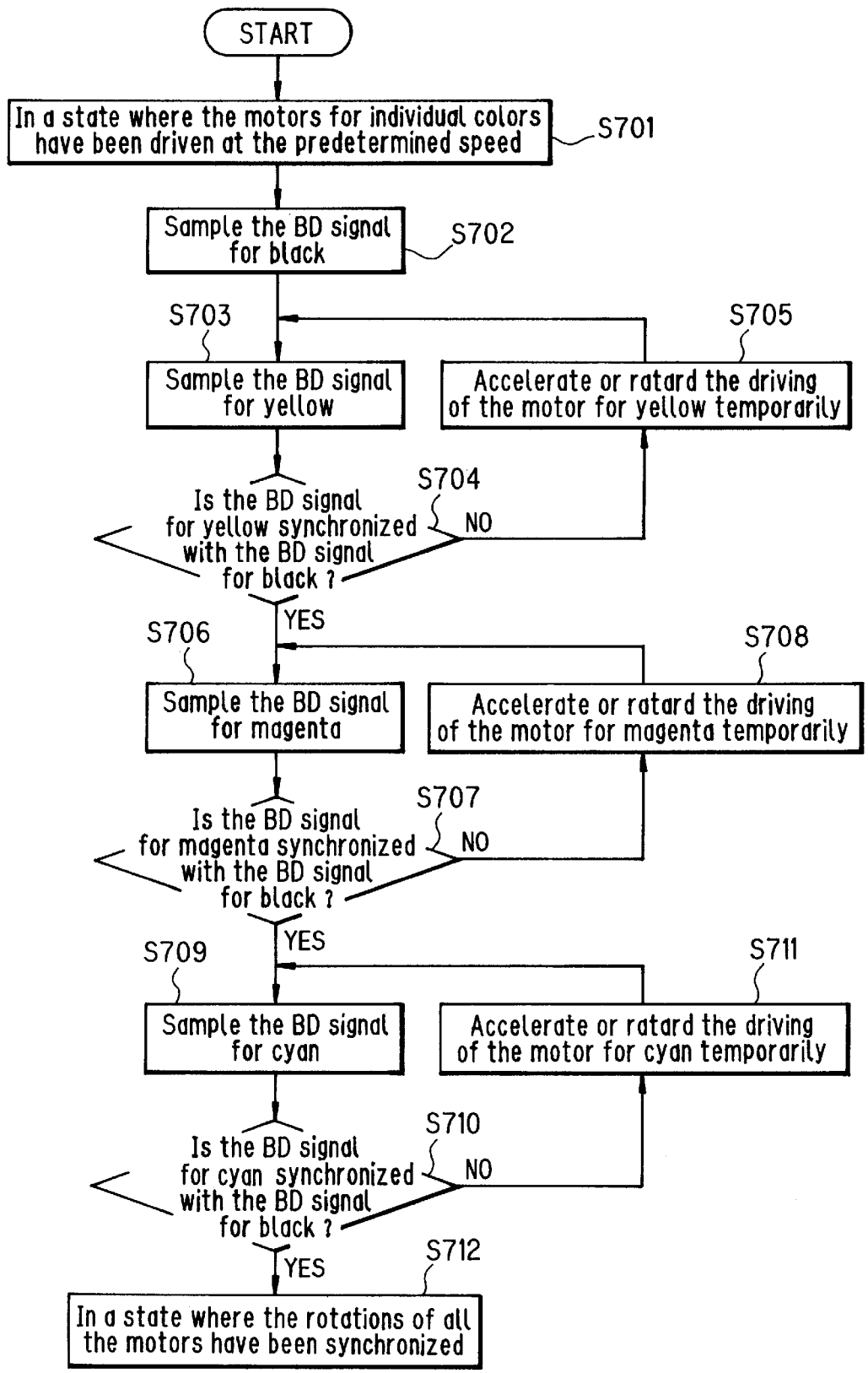
FIG. 7 is a flowchart showing the control of the operation of the first embodiment.

Referring next to FIG. 7, explanation will be made of the control flow in the above embodiment.

First, LCU 32a starts the driving motors for individual colors and controls them so as to rotate at the predetermined speed (Step S701), and then samples the BD signal from BD 88d for black (Step S702). Next, LCU 32a samples the BD signal from BD 88a for yellow (Step S703) and judges whether the signal is synchronized with the BD signal from BD 88d for black (Step S704). If the signal is not synchronized, the rotation of the driving motor of LSU 27a for yellow is adjusted, i.e., either accelerated or retarded (Step S705), and then the operation returns to Step S703 to repeat the same procedures until the two signals come into phase.

On the other hand, if the two signals are synchronized with each other at Step S704, LCU 32a samples the BD signal from BD 88b for magenta (Step S706), and judges whether the signal is synchronized with the BD signal from BD 88d, in a similar manner as above (Step S707). If the signal is not synchronized, the rotation of the driving motor of LSU 27b for magenta is adjusted, either accelerated or retarded (Step S708), and then the operation returns to Step S706 to repeat the same procedures until the two signals come into phase.

If the two signals are synchronized with each other at Step S707, LCU 32a samples the BD signal from BD 88c for cyan (Step S709), and judges whether the signal is synchronized with the BD signal from BD 88d, in a similar manner as above (Step S710). If the signal is not synchronized, the rotation of the driving motor of LSU 27c for cyan is adjusted, either accelerated or retarded (Step S711), and then the operation returns to Step S709 to repeat the same procedures until the two signals come into phase.

If the two signals are synchronized with each other at Step S710, all the driving motors are recognized as having become synchronized so that the control for synchronization is ended (Step S712).

After all the driving motors have been synchronized with each other as stated above, color copying is implemented.

In this way, based on the BD signal of LSU 27d for recording black images, the driving motors of LSUs 27a to 27c for recording yellow, magenta and cyan images, respectively, are driven so that the BD signals from these laser recording portions are synchronized with one another to thereby synchronize the rotations of the driving motors for all colors with precision in a short time. As a result, it is possible to start recording quickly whilst providing high-quality color images.

The 2nd Embodiment

Next, the second embodiment will be described. This embodiment is implemented in the digital color copier described above, in which LCU 32*a*, based on the periodical signal obtained every predetermined period from the first laser scanner unit, one of LSUs 27*a* to 27*d* arranged in parallel with each other, which has already been driven under the predetermined rotation conditions, rotates the second laser scanner units and controls each of the laser scanner units so as to produce synchronized periodical signals.

In the digital color copier in accordance with the invention, the black component is generally added to improve black reproduction and thereby enhance the total color reproducibility of the color image. Therefore, the digital copier also has a monochrome mode other than the color mode and hence typically has capability of performing both color copying and monochrome copying.

In a digital color copier of this type, in order to enhance the life of the driving motors of polygon mirrors as well as solve the noise problems such as whirring due to air-turbulence caused by rotating polygon mirrors, etc., polygon mirror 82*d* for recording black color component, which is used more frequently, is kept in a waiting mode with its speed of rotation at the predetermined rate while polygon mirrors 82*a*, 82*b* and 82*c* for recording other color components are kept in a waiting mode by being usually stopped.

Accordingly, when the polygon mirrors are synchronized with each other for color copying, from the state in which polygon mirror 82*d* for recording black color component is kept at the predetermined speed of rotation, it is possible to correct the time lags of the signals from BDs 88*a*, 88*b* and 88*c*, based on the signal from BD 88*d* for black recording, which has been already rotating at the stabilized speed, and hence it is possible to quickly raise and stabilize the drives of the other polygon mirrors to the highly precise, synchronized state.

Figure 8:
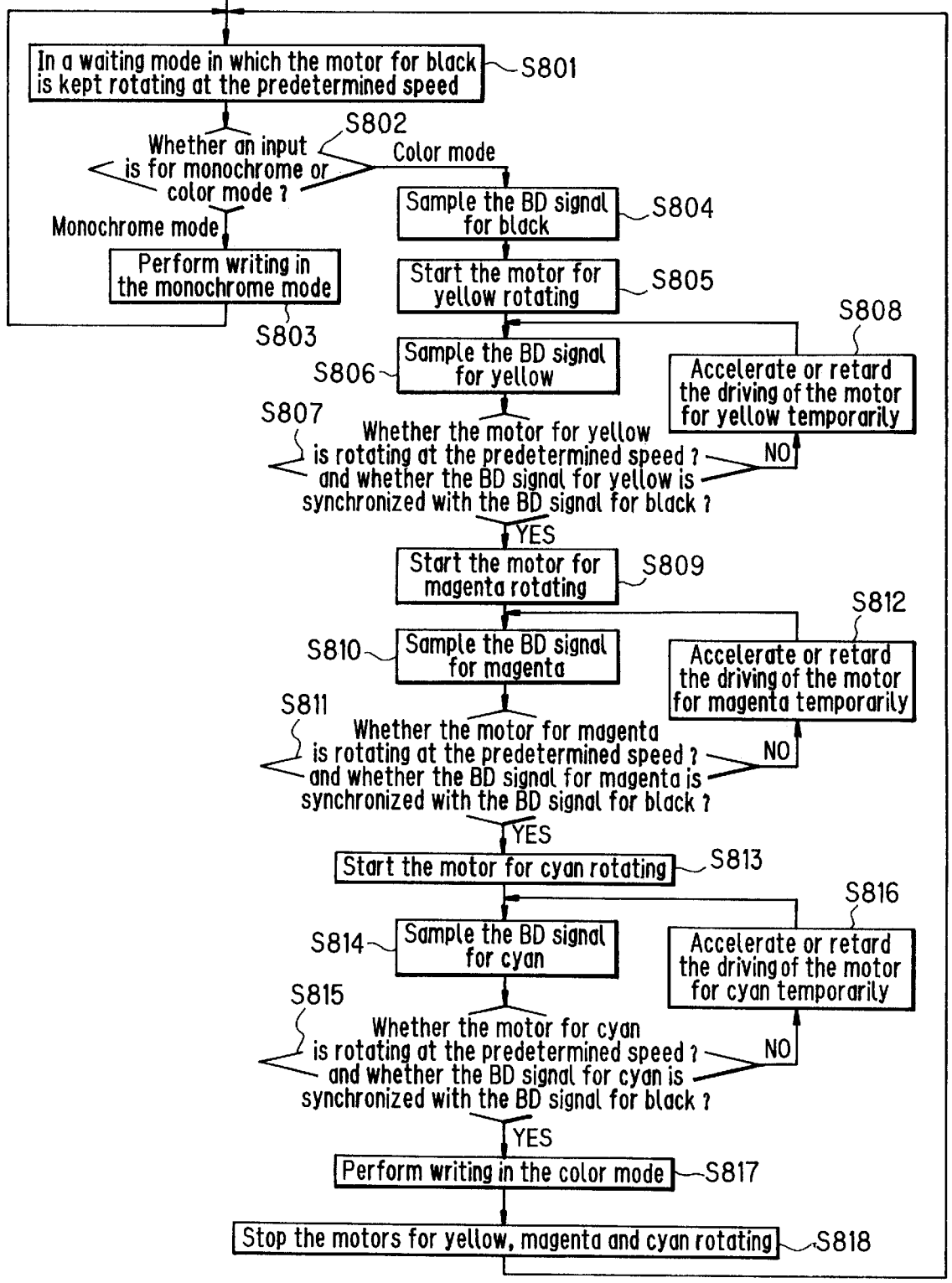
FIG. 8 is a flowchart showing the control of the operation of the second embodiment.

Next, the control flow in the above embodiment will be described with reference to FIG. 8.

First, in the state where the driving motor for black is kept in a waiting mode whilst rotating at the predetermined speed of rotation (Step S801), if an input is made, CPU 34 judges whether the input is for monochrome mode or color mode (Step S802). If it is of the monochrome mode, writing in the monochrome mode starts (Step S803).

If the input is determined as of the color mode at Step S802, LCU 32*a* samples the BD signal from BD 88*d* for black recording (Step S804), and then starts the driving motor of LSU 27*a* for yellow rotating (Step S805). Next, LCU 32*a* samples the BD signal from BD 88*a* for yellow (Step S806) and judges whether the driving motor of LSU 27*a* for yellow is rotating at the predetermined speed so that the signal is synchronized with the BD signal from BD 88*d* for black (Step S807). If the signal is not synchronized, the rotation of the driving motor for yellow is adjusted, i.e., either accelerated or retarded (Step S808), and then the operation returns to Step S806 to repeat the same procedures until the two signals come into phase.

If the two signals are synchronized with each other at Step S807, then the LCU starts the driving motor of LSU 27*b* for magenta rotating (Step S809). Next, LCU 32*a* samples the BD signal from BD 88*b* for magenta (Step S810) and judges whether the driving motor of LSU 27*b* for magenta is rotating at the predetermined speed so that the signal is synchronized with the BD signal from BD 88*d* for black (Step S811). If the signal is not synchronized, the rotation of the driving motor for magenta is adjusted, i.e., either accelerated or retarded (Step S812), and then the operation returns to Step S810 to repeat the same procedures until the two signals come into phase.

If the two signals are synchronized with each other at Step S811, then the LCU starts the driving motor of LSU 27*c* for cyan rotating (Step S813). Next, LCU 32*a* samples the BD signal from BD 88*c* for cyan (Step S814) and judges whether the driving motor of LSU 27*c* for cyan is rotating at the predetermined speed so that the signal is synchronized with the BD signal from BD 88*d* for black (Step S815). If the signal is not synchronized, the rotation of the driving motor for cyan is adjusted, i.e., either accelerated or retarded (Step S816), and then the operation returns to Step S814 to repeat the same procedures until the two signals come into phase.

If the two signals are synchronized with each other at Step S815, all the driving motors are recognized as having become synchronized so that recording in the color mode is performed (Step S817). After completion of the color copying operation, the drives of the driving motors other than the one for black are stopped to end the operation and the machine enters the waiting mode.

In this way, the driving motor of LSU 27*d* for recording black color component of the image is kept in a waiting mode whilst rotating with the predetermined speed of rotation. From this state, based on the BD signal of LSU 27*d*, the driving motors of LSUs 27*a* to 27*c* for recording color image components, which generally are in a stopped, standby state, are activated and driven so that the BD signals from these laser recording units are synchronized with one another. Once again, based on the signal produced from the driving motor, which already has been rotating at the stabilized speed, the remaining motors are accelerated whilst being manipulated so as to synchronize their rotations. Thus, the rotations of the motors of individual color components can be synchronized precisely within a short time, and hence it is possible to provide high-quality color images as well as shorten the waiting time before recording.

The 3rd Embodiment

Next, the third embodiment will be explained. As has been described in the second embodiment, typical digital color copiers have both color copy and monochrome copy modes. However, the monochrome copy mode is currently used much more, and hence many people demand that monochrome copying should be done at a higher speed.

As a natural result of this demand, a configuration may be considered in which the copy speed in the color mode is differentiated from that in the monochrome mode, that is, the copy speed in the monochrome mode is set higher than that in the color mode, to thereby allow for use of simple and inexpensive parts for LSUs 27*a*, 27*b* and 27*c* which will be used in the color mode only while the parts for LSU 27*d* for the monochrome mode are of long-life and durable for high-speed driving.

As to the control, when the machine is operated in the monochrome mode and stays in the standby mode, LCU 32*a* outputs the reference frequency signal obtained from oscillator 85 so that polygon mirror 82*d* rotates at the first speed of rotation. In the color mode, LCU 32*a* frequency divides the signal from oscillator 85 and provides it as a reference frequency signal to LSU 27a, 27b, 27c and 27d so as to drive the polygon mirrors 82a, 82b, 82c and 82d at the second speed of rotation. Thus, this configuration, not needing an extra separate oscillator for generating an individual reference frequency signal, facilitates the change in the driving speed of rotation. Further, the use of a single oscillator eliminates the necessity for taking into account the deviation between the oscillation frequencies which would arise due to provision of multiple oscillators.

When the control described above is performed, it is possible to correct the time lags of the signals from BDs 88a, 88b and 88c, in a manner similar to that in the second embodiment, relative to the signal from BD 88d of LSU 27d for recording black color component, which is equipped with high-performance parts and has been standing by whilst also rotating, and hence it is possible to quickly raise and stabilize the drives of the other motors to the highly precise, synchronized state.

Figure 9:
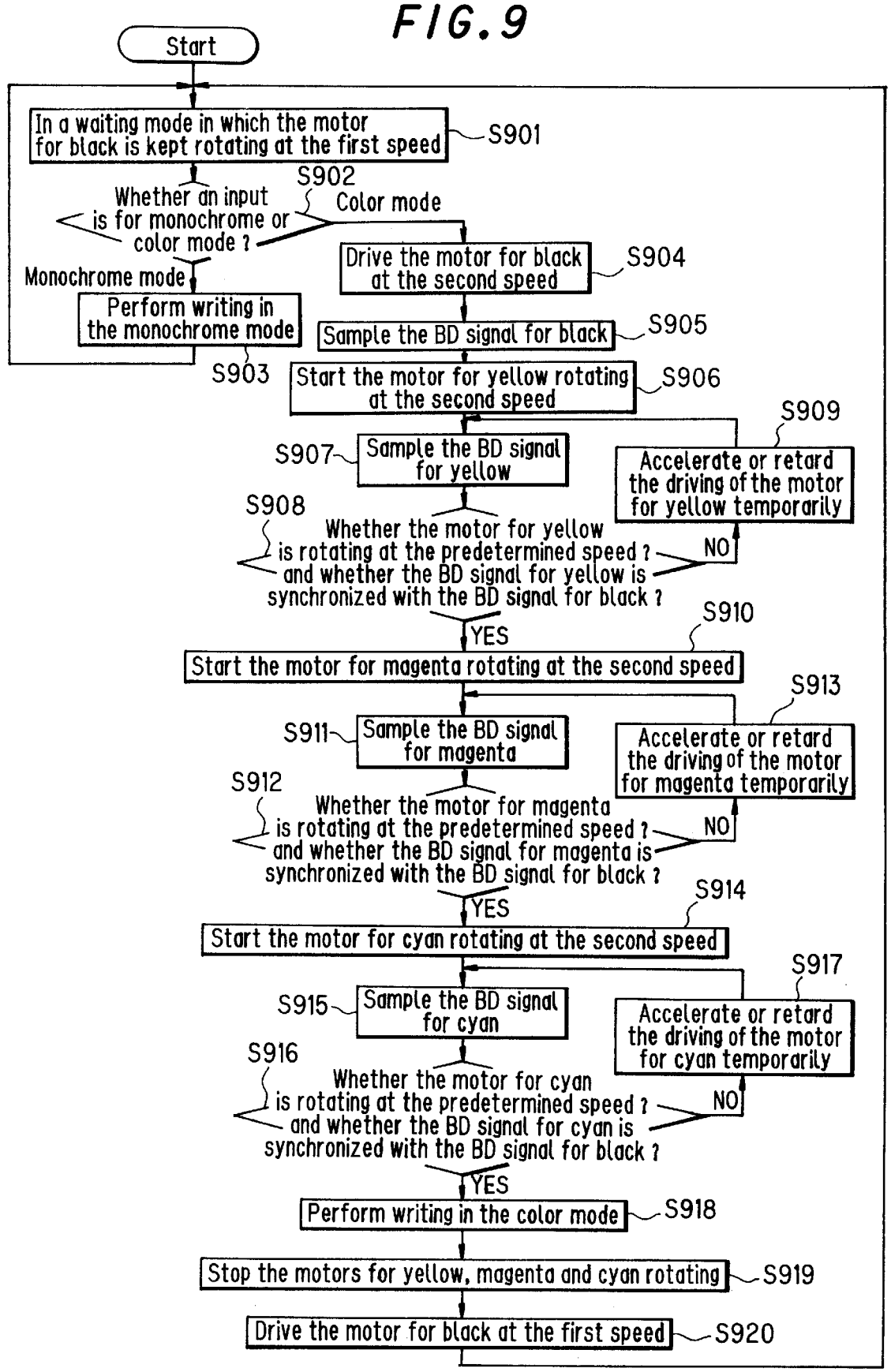
FIG. 9 is a flowchart showing the control of the operation of the third embodiment.

Next, the control flow in the above embodiment will be described with reference to FIG. 9.

First, in the state where the driving motor of LSU 27d for black is in a rotational standby state at the first speed of rotation (Step S901), if an input is made, CPU 34 judges whether the input is for monochrome mode or color mode (Step S902). If it is of the monochrome mode, writing in the monochrome mode starts (Step S903).

If the input is determined to be the color mode at Step S902, LCU 32a, after having set the driving motor for black so as to rotate at the second speed of rotation (Step S904), samples the BD signal from BD 88d for black recording (Step S905), and then starts the driving motor of LSU 27a for yellow rotating at the second speed of rotation (Step S906). Next, LCU 32a samples the BD signal from BD 88a for yellow (Step S907) and judges whether the driving motor of LSU 27a for yellow is rotating at the predetermined speed of rotation so that the signal is synchronized with the BD signal from BD 88d for black (Step S908). If the signal is not synchronized, the rotation of the driving motor for yellow is adjusted, i.e., either accelerated or retarded (Step S909), and then the operation returns to Step S907 to repeat the same procedures until the two signals come into phase.

If the two signals are synchronized with each other at Step S908, then the LCU starts the driving motor of LSU 27b for magenta rotating at the second speed of rotation (Step S910). Next, LCU 32a samples the BD signal from BD 88b for magenta (Step S911) and judges whether the driving motor of LSU 27b for magenta is rotating at the predetermined speed of rotation so that the signal is synchronized with the BD signal from BD 88d for black (Step S912). If the signal is not synchronized, the rotation of the driving motor for magenta is adjusted, i.e., either accelerated or retarded (Step S913), and then the operation returns to Step S911 to repeat the same procedures until the two signals come into phase.

If the two signals are synchronized with each other at Step S912, then the LCU starts the driving motor of LSU 27c for cyan rotating at the second speed of rotation (Step S914). Next, LCU 32a samples the BD signal from BD 88c for cyan (Step S915) and judges whether the driving motor of LSU 27c for cyan is rotating at the predetermined speed so that the signal is synchronized with the BD signal from BD 88d for black (Step S916). If the signal is not synchronized, the rotation of the driving motor for cyan is adjusted, i.e., either accelerated or retarded (Step S917), and then the operation returns to Step S915 to repeat the same procedures until the two signals come into phase.

If the two signals are synchronized with each other at Step S916, all the driving motors are recognized as having become synchronized so that recording in the color mode is performed (Step S918). After completion of the color copying operation, the drives of the driving motors other than the one for black are stopped (step S919) while the driving motor for black is kept rotating at the first speed of rotation to maintain the standby state.

Next, another configuration of the third embodiment will be described hereinbelow. In this embodiment, polygon mirror 82d for recording black color component is adapted to be standing by at the second speed of rotation at which all the polygon mirrors will be driven in synchronism in the color mode. Upon color mode, based on the signal from BD 88d of LSU 27d for recording black color component, which is stably rotating at the second speed of rotation, the time lags of the signals from other BDs 88a, 88b and 88c are modified thereto. This configuration facilitates a quicker and more precise set up and synchronization of drives of the motors in the color mode. In the monochrome mode, it is not necessary for the polygon mirror 82d for recording black color component to be synchronized with any drive, so it is possible to set the motor from the second speed of rotation, for standby, to the first speed of rotation in a quicker and more stable manner.

Figure 10:
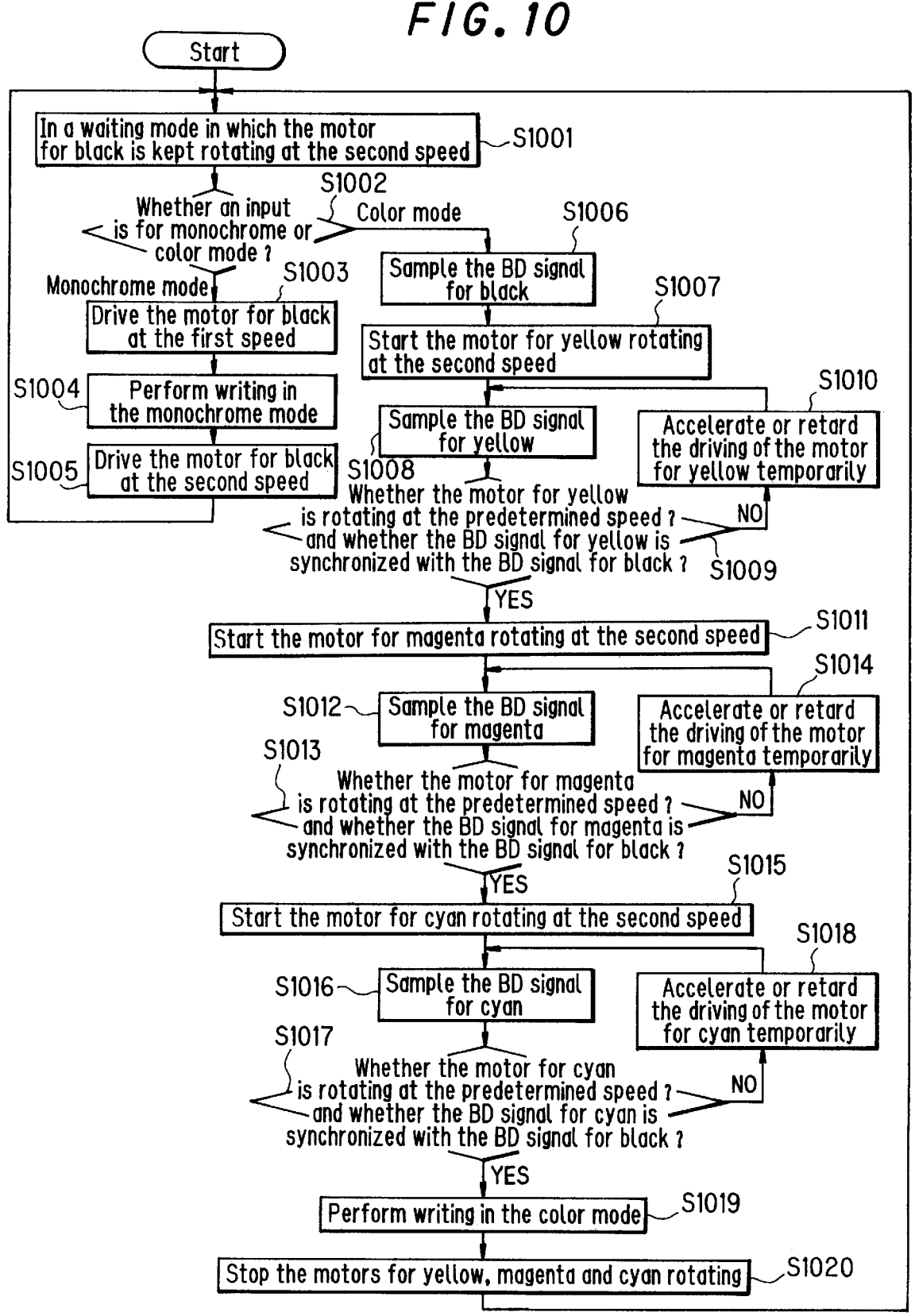
FIG. 10 is a flowchart showing the control of the operation of the fourth embodiment.

Next, the control flow in the above embodiment will be described with reference to FIG. 10.

First, in the state where the driving motor of LSU 27d for black is in a rotational standby state, rotating at the second speed of rotation (Step S1001), if an input is made, CPU 34 judges whether the input is for monochrome mode or color mode (Step S1002). If it is of the monochrome mode, the driving motor for black is set into the first speed of rotation (Step S1003) so as to perform writing in the monochrome mode (step S1004). After the completion of writing, the driving motor for black is set into the second speed of rotation (Step S1005) for the standby state.

If the input is determined to be the color mode at Step S1002, LCU 32a samples the BD signal from BD 88d for black (Step S1006), and then starts the driving motor of LSU 27a for yellow rotating at the second speed of rotation (Step S1007). Next, LCU 32a samples the BD signal from BD 88a for yellow (Step S1008) and judges whether the driving motor of LSU 27a for yellow is rotating at the predetermined speed so that the signal is synchronized with the BD signal from BD 88d for black (Step S1009). If the signal is not synchronized, the rotation of the driving motor for yellow is adjusted, i.e., either accelerated or retarded (Step S1010), and then the operation returns to Step S1008 to repeat the same procedures until the two signals come into phase.

If the two signals are synchronized with each other at Step S1009, then the LCU starts the driving motor of LSU 27b for magenta rotating at the second speed of rotation (Step S1011). Next, LCU 32a samples the BD signal from BD 88b for magenta (Step S1012) and judges whether the driving motor for magenta is rotating at the predetermined speed so that the signal is synchronized with the BD signal from BD 88d for black (Step S1013). If the signal is not synchronized, the rotation of the driving motor for magenta is adjusted, i.e., either accelerated or retarded (Step S1014), and then the operation returns to Step S1012 to repeat the same procedures until the two signals come into phase.

If the two signals are synchronized with each other at Step S1013, then the LCU starts the driving motor of LSU 27c for cyan rotating at the second speed of rotation (Step S1015). Next, LCU 32a samples the BD signal from BD 88c for cyan (Step S1016) and judges whether the driving motor for cyan is rotating at the predetermined speed so that the signal is synchronized with the BD signal for black (Step S1017). If the signal is not synchronized, the rotation of the driving motor for cyan is adjusted, i.e., either accelerated or retarded (Step S1018), and then the operation returns to Step S1016 to repeat the same procedures until the two signals come into phase.

If the two signals are synchronized with each other at Step S1017, all the driving motors are recognized as having become synchronized so that recording in the color mode is performed (Step S1019). After completion of the color copying operation, the drives of the driving motors other than the one for black are stopped (step S1020) so that the machine can be maintained in the standby state.

In this way, the speeds of rotation of the polygon mirrors can be controlled using a signal oscillator, thus making it possible to control the speeds of rotation of the multiple polygon mirrors in a quick and precise manner without needing extra parts and/or a complicated configuration. As a result, the copy speed in the monochrome mode which is used more frequently, can be set higher than that in the color mode, and it is possible to allow for use of simple and inexpensive parts for LSUs 27a to 27c which will be used in the color mode only while the parts for LSU 27d for the monochrome mode are of long-life and durable for high-speed driving.

The 4th Embodiment

Next, the fourth embodiment will be explained. All the configurations described heretofore use a scheme in which, the timing of the signal from the reference BD is compared to the signals from the other BDs, and if there are time lags, signals for retarding or increasing the speeds of rotation of the polygon mirrors are temporarily output to the other laser beam scanner units and these procedures are repeated until the time lags of the signals from the other BDs, from the signal from the reference BD fall within the predetermined range. This embodiment further aims at preventing defects during writing in the above embodiments.

In the monochrome mode, the signal from LSU 27d for recording black color component is used to check whether polygon mirror 82d has reached the speed of rotation corresponding to the predetermined reference frequency. Then, LSU 32a outputs a signal allowing for copy start to CPU 34 of the copier body. In the color mode, after the time lag of the signal from each BD, from the signal from the reference BD has fallen within the predetermined range, the signal from each LSU is checked so as to confirm that each polygon mirror has reached the speed of rotation corresponding to the predetermined reference frequency. Then, LSU 32a outputs a signal allowing for copy start to the CPU of the copier body.

No drawings for the control of this embodiment are shown, but each of the control flows shown in FIGS. 7 through 10 and FIG. 11 for the next configuration, may be added with an extra step of confirming that each driving motor for each color component has reached the predetermined speed of rotation to thereby start copying in the color mode.

In this way, it is possible to prevent copying when the rotations of all the polygon mirrors are not synchronized with each other. Thus, this configuration prevents degradation of color images such as color banding etc., and provides for a reliable quality of image.

The 5th Embodiment

Next, the fifth embodiment will be described. In addition to the digital color copier of the fourth embodiment shown above, the motor controller of this embodiment is further adapted to give warning if the synchronizing signal to be obtained from each laser scanner at every predetermined period, is not obtained as being in phase, within a predetermined period of time.

When the requirement for the polygon mirrors to reach the predetermined speed of rotation has not been met within the predetermined period of time, the occurrence of the anomaly is displayed on liquid crystal display device 51 on the control panel shown in FIG. 4 so as to inform the user that the machine is in a state in which the resulting images cannot be guaranteed and to recommend that the user check the defects to thereby assure the reliability of the copier.

Figure 11:
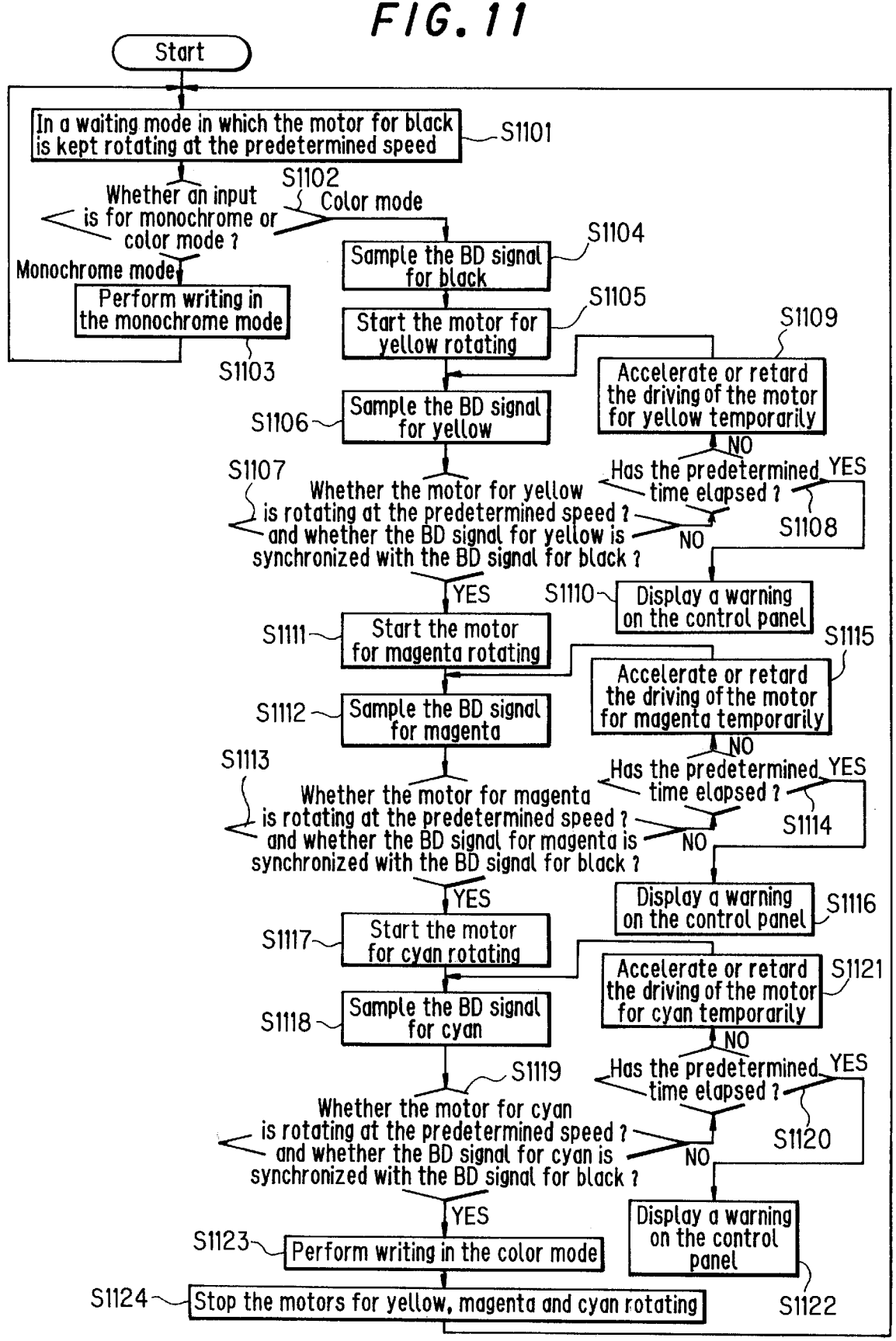
FIG. 11 is a flowchart showing the control of the operation of the fifth embodiment.

Next the control flow of this embodiment will be explained with reference to FIG. 11.

First, in the state where the driving motor of LSU 27d for black is in a rotational standby state, rotating at the predetermined speed of rotation (Step S1101), if an input is made, CPU 34 judges whether the input is for monochrome mode or color mode (Step S1102). If it is of the monochrome mode, writing in the monochrome mode starts (Step S1103).

If the input is determined to be the color mode at Step S1102, LCU 32a samples the BD signal from BD 88d for black (Step S1104), and then starts the driving motor of LSU 27a for yellow rotating (Step S1105). Next, LCU 32a samples the BD signal from BD 88a for yellow (Step S1106) and judges whether the driving motor of LSU 27a for yellow is rotating at the predetermined speed so that the signal is synchronized with the BD signal from BD 88d for black (Step S1107). If the signal is out of phase and the predetermined time has not yet elapsed (Step S1108), the rotation of the driving motor for yellow is adjusted, i.e., either accelerated or retarded (Step S1109), and then the operation returns to Step S1106. If the predetermined time has elapsed with the signal remaining out of phase, a warning message is displayed on the control panel (Step S1110).

If the two signals are synchronized with each other at Step S1107, then the LCU starts the driving motor of LSU 27b for magenta rotating (Step S1111). Next, LCU 32a samples the BD signal from BD 88b for magenta (Step S1112) and judges whether the driving motor for magenta is rotating at the predetermined speed so that the signal is synchronized with the BD signal from BD 88d for black (Step S1113). If the signal is out of phase and the predetermined time has not yet elapsed (Step S1114), the rotation of the driving motor for magenta is adjusted, i.e., either accelerated or retarded (Step S1115), and then the operation returns to Step S1112. If the predetermined time has elapsed with the signal remaining out of phase, a warning message is displayed on the control panel (Step S1116).

If the two signals are synchronized with each other at Step S1113, then the LCU starts the driving motor of LSU 27c for cyan rotating (Step S1117). Next, LCU 32a samples the BD signal from BD 88c for cyan (Step S1118) and judges whether the driving motor for cyan is rotating at the predetermined speed so that the signal is synchronized with the BD signal from BD 88d for black (Step S1119). If the signal is out of phase and the predetermined time has not yet elapsed (Step S1120), the rotation of the driving motor for cyan is adjusted, i.e., either accelerated or retarded (Step S1121), and then the operation returns to Step S1118. If the predetermined time has elapsed with the signal remaining out of phase, a warning message is displayed on the control panel (Step S1122).

If the two signals are synchronized with each other at Step S1119, all the driving motors are recognized as having become synchronized so that recording in the color mode is performed (Step S1123). After completion of the color copying operation, the drives of the driving motors other than the one for black are stopped (Step S1124) and the machine is kept in its standby state.

In this way, if the drives of the polygon mirrors cannot be stabilized and the polygon mirrors for colors cannot be synchronized with each other within the predetermined period of time, the fact of any anomaly occurring will be displayed on the liquid crystal display device on the control panel so as to inform the user that the machine is in a state in which the resulting image quality cannot be guaranteed and recommend that the user perform a check to thereby prevent loss of the reliability of the copier.

As has been described heretofore with the first through fifth embodiments, in accordance with the invention, it is known that the drives of the separate driving motors for color can be easily harmonized with that of the driving motor for black whilst it is continuously rotating. When a color image is formed with color components, yellow, magenta, cyan and black, the positioning of black dots with respect to yellow, magenta and cyan dots has a critical effect on the quality of the resulting image. In accordance with the invention, the positional relationships of these dots can be controlled by adjusting the synchronizing positions of the laser beam scanner units with one another, thus making it possible to produce an improved image in a simple manner.

In accordance with the first feature of the invention, based on one of the BD signals from the laser recording units for recording images of yellow, magenta, cyan and black, the driving motors of the remaining laser recording units for recording images are driven in such a manner that the BD signal from each laser recording unit is synchronized with that of others. As a result, the rotation of the driving motor for each color can be precisely synchronized with that of the others within a short period, and hence it is possible to provide high-quality color images as well as shortening the time before recording can occur.

In accordance with the second feature of the invention, the laser scanner for recording black color component is in the standby state with the predetermined speed of rotation, and based on the BD signal from the scanner for black as a reference, the driving motors of the laser scanners for recording color components of the image, which are in a stopped, standby state are driven in such a manner that the BD signal from each laser scanner will be synchronized with the reference BD signal. Thus, based on the signal from the driving motor which is rotating at the stabilized rate, the drives of the remaining motors will be synchronized as rotating while the motors are set into the proper state. As a result, the rotation of the driving motor for each color can be precisely synchronized with that of the others within a short period, and hence it is possible to provide high-quality color images as well as shortening the time before recording.

In accordance with the third feature of the invention, the speed of rotation of multiple rotational polygon mirrors can be controlled using a single oscillator, precisely and within a short time, without needing an increased number of parts and/or a complicated configuration. Accordingly, the copying operation in the monochrome mode which is used more frequently, can be performed at higher rate, and it is possible to allow for use of simple and inexpensive parts for the laser scanners which will be used in the color mode only while the parts of the laser scanner for the monochrome mode are of long-life and durable for high-speed driving.

In accordance with the fourth feature of the invention, since laser scanning is started based on the synchronizing signal obtained at intervals of a predetermined period from each laser scanner, it is possible to prevent the implementation of copying when the rotations of the polygon mirrors are asynchronous with each other. Accordingly, this configuration prevents degradation of color images such as color banding etc., and can keep a reliable quality of image.

In accordance with the fifth feature of the invention, if the drives of the polygon mirrors cannot be stabilized and the polygon mirrors for colors cannot be synchronized with each other within the predetermined period of time, the fact that any anomaly has occurred will be displayed on the liquid crystal display device on the control panel so as to inform the user that the machine is in a state in which the resulting image quality cannot be guaranteed and recommends that the user perform a check thereby prevent loss of the reliability of the copier.

What is claimed is:

1. A color image forming apparatus comprising:
   an image information input means for inputting image information;
   a laser recording means having a plurality of laser scanner units for component colors of images, arranged in parallel with each other, each scanner unit including a laser, a rotational polygon mirror and a driving motor for driving the rotational polygon mirror;
   a laser scan control means for governing the drives of the driving motors for performing laser scanning in accordance with the image information; and
   an image forming means having a plurality of image forming units for component colors, for forming images, arranged in parallel with each other, each image forming unit forming an image from the latent image recorded on the photoreceptor by the corresponding laser scanner unit, wherein the laser scan control means, based on the periodic signal obtained every predetermined period of time from the laser scanner unit which is driven under the predetermined rotational conditions, of the plurality of laser scanner units arranged in parallel with each other, drives the rotations of the remaining laser scanner units and controls each laser scanner unit so that the periodic signals from all the laser scanner units become synchronized with each other.

2. A color image forming apparatus comprising:
   an image information input means for inputting image information;
   a laser recording means having a plurality of laser scanner component colors of images, arranged in parallel with each other, each scanner unit including a laser, a rotational polygon mirror and a driving motor for driving the rotational polygon mirror;
   a laser scan control means for governing the drives of the driving motors for performing laser scanning in accordance with the image information; and
   an image forming means having a plurality of image forming units for component colors, for forming images, arranged in parallel with each other, each image forming unit forming an image from the latent image recorded on the photoreceptor by the corresponding laser scanner unit, wherein the laser scan control means, based on the periodic signal obtained every predetermined period of time from the first laser scanner unit which has been driven under the predetermined rotational conditions, of the plurality of laser scanner units arranged in parallel with each other, drives the rotation of the second laser scanner units and controls each laser scanner unit so that the periodic signals from all the laser scanner units become synchronized with each other.

3. The color image forming apparatus according to claim 2, wherein the laser scanner control means performs control, either by the first mode in which a monochrome image is produced by controlling the scanning of the rotational polygon mirror in the first laser scanner unit so as to rotate it based on the first reference clock signal, or by the second mode in which the second reference clock signal is produced by frequency dividing the first reference clock signal so that a color image is produced by controlling the scanning of the rotational polygon mirror in the first laser scanner unit so as to rotate it based on the second reference clock signal and also by controlling the drives of the rotational polygon mirrors in the second laser scanner units so as to rotate them based on the same clock signal.

4. The color image forming apparatus according to claim 2, wherein the laser scanner control means starts laser scanning based on the synchronizing signals obtained at intervals of a predetermined period from each of the laser scanner units, and when a monochrome image is produced by laser scanning, the scanning and recording of a monochrome image is allowed for based on the synchronizing signal obtained from the first laser scanner unit, whereas when a color image is produced by laser scanning, the scanning and recording of a color image is allowed for based on the synchronizing signals from the first laser scanning unit and the second laser scanning units.

5. The color image forming apparatus according to claim 4, wherein the laser scanner control means gives warning of an anomalous state, if the synchronizing signals to be obtained at intervals of a predetermined period from the laser scanning units are not obtained within the predetermined time.

* * * * *